United States Patent [19]
Campbell et al.

[11] Patent Number: 5,650,127
[45] Date of Patent: Jul. 22, 1997

[54] NOX REMOVAL PROCESS

[75] Inventors: Larry E. Campbell, Knoxville, Tenn.; Eugene D. Guth, Torrance; Robert Danziger, Los Angeles, both of Calif.

[73] Assignee: Goal Line Environmental Technologies, Los Angeles, Calif.

[21] Appl. No.: 355,030

[22] Filed: Dec. 13, 1994

Related U.S. Application Data

[63] Continuation of Ser. No. 66,361, May 24, 1993, abandoned.
[51] Int. Cl.$^6$ .................................................. B01J 8/02
[52] U.S. Cl. .................................................. 423/239.1
[58] Field of Search ........................... 423/239.1; 95/129

[56] References Cited

U.S. PATENT DOCUMENTS 3,953,575  4/1976  Gidaspow et al. ............... 423/239.1
4,533,365  8/1985  Ringel .................................. 95/129
5,227,145  7/1993  Kintaichi et al. ................... 423/239.1

FOREIGN PATENT DOCUMENTS 488250    6/1992  European Pat. Off. ......... 423/239.1
1-224031  9/1989  Japan ............................... 423/239.1
4-267946  9/1992  Japan ............................... 423/239.1

Primary Examiner—Steven Bos
Assistant Examiner—Stuart L. Hendrickson
Attorney, Agent, or Firm—Kenneth H. Johnson

[57] ABSTRACT

A method of decreasing the level of NOx and CO emissions in a gas turbine is disclosed. The method includes the steps of oxidizing NO and CO in the gas stream to corresponding $NO_2$ and $CO_2$, and then absorbing the nitrogen oxide pollutants on an absorption bed. The method can achieve levels of 0 to 2 ppm CO and 0.35 to 1.5 ppm NO in the resultant stream.

16 Claims, 14 Drawing Sheets

FIG. 7a POLLUTION CONTROL CATALYST (Detail)

NOX REMOVAL PROCESS

This application is a continuation of application Ser. No. 08/066,361, filed May 24, 1993, now abandoned.

BACKGROUND OF THE INVENTION

1. Field of the Invention

The present invention relates to a process for reducing and destroying pollutants, namely nitrogen oxides (NOx) and carbon monoxide (CO), which are produced by combustion of hydrocarbons in an engine, and primarily, in a gas turbine. The present invention is also directed to an apparatus for performing the process.

2. Art Background

Turbine power plants are becoming the standard for generating electricity because they are so efficient compared to any other form of power manufacture. Turbine power plants that burn methane to produce power for residents and manufacturing facilities in cities also produce carbon monoxide and nitrogen oxide as pollutants. It is highly desirable to reduce or eliminate these pollutants so that the air is not contaminated as a result of power production.

Initially, the permitted level of pollution by power plants for nitrogen oxides (NOx), which includes nitric oxide (NO) and nitrogen dioxide ($NO_2$), was less than 100 parts-per-million (ppm) and the level of carbon monoxide (CO) was to a level of less than 100 ppm. Later, a second step was taken to reduce the NOx to less than 25 ppm and the CO today is still permitted at any amount less than 100 ppm. Using current technology, the output levels of NOx can be reduced to the range of 5 to 9 ppm plus slippage resulting from the selective catalytic reduction (scr) technology described below.

The only technology which is currently available to obtain the 5–9 ppm NOx levels is called selective catalytic reduction, in which ammonia is mixed with the flue gas and then passed over a catalyst which selectively combines the nitrogen oxides and ammonia to eliminate a major portion of the NOx One problem with the selective catalytic reduction is that as a practical matter, it is only capable of reducing the NOx to the range of 5 to 9 ppm. Mother problem, referred to as slippage, is caused by hazardous ammonia passing through the catalyst.

There have been other technologies for reduction of pollution which have been advanced, such as overwatering in the combustor, and these also have the potential to reduce the NOx pollution, but none of them reduce the NOx to levels much less than 5 to 9 ppm.

SUMMARY OF THE INVENTION

The present invention has the capability of reducing hydrocarbon burning engine waste pollutants, and particularly those from a gas turbine, both NOx and CO, to 1 or 2 ppm or less, depending upon the specific application. As far as the present inventors are aware, no other technology has the ability to perform as effectively as the performance of the present invention.

Now, in order to remove the pollutants which comprise NOx (including NO and $NO_2$), and CO, the present invention follows a completely different path than the prior art methods. The pollutants from a turbine in a power generating stack are primarily present as NO, with maybe 10–20% $NO_2$. The prior art processes, like selective catalytic reduction, reduces the $NO_2$ and NO by reacting it in the presence of ammonia to form nitrogen gas and water. The chemical properties of nitric oxide make it a fairly inert material; it is not reactive as an acid and it is essentially more difficult to dissolve in solvents such as water.

In our process we have found that taking a completely opposite approach can and does reduce the pollutants to levels as low as below 1 ppm and below. Our process takes advantage of a step which is oxidation. This produces $NO_2$ from substantially all of the oxides of nitrogen. $NO_2$ is a much more active material and can be and is absorbed readily from the gas stream even when present at low concentrations in the ppm range.

The turbine exhaust gases are initially at about 1000° F. after the shaft energy has been withdrawn them. These gases are then passed over heat exchangers to remove energy and produce steam while cooling the exhaust or stack gases. Stack gases are moving at high velocity depending upon the diameter of the stack, and after heat is removed, the stack gases typically are in the range of 250° to 500° F. and travel about 30–50 feet per second. The gas contains 13–15% oxygen, up to about 12% water, and about 4% carbon dioxide. This is in addition to the pollutants, which are the NOx mixed with approximately 90% NO and 10% $NO_2$ and CO in the range of 30 to 200 ppm.

The present invention involves a two step process to remove the NOx and carbon monoxide from the stack gases. The first step is to oxidize substantially all of the nitrogen oxides to nitrogen dioxide. This step occurs at temperatures in the range of 200° to 1000° F., and more preferably 450° to 800° F. and at a space velocity of the exhaust gas in the range of 10,000 to 60,000 therefor $hr^{-1}$, and more preferably 20,000 to 40,000 therefor $hr^{-1}$. The preferred conditions are 550° F.±20° F. for the temperature of the oxidation, and a space velocity of 30,000±5,000 therefor $hr^{-1}$. As used herein, the term space velocity means volume units of flow per volume units of catalyst per hour. Nitrogen dioxide ($NO_2$) is much more active than nitric oxide (NO) to absorption. There are at least several catalysts which can oxidize nitric oxide to nitrogen dioxide rapidly under the conditions which exist in the stack.

The preferred catalyst is a platinum catalyst supported on alumina coated with zirconia, the platinum being present at about 46 grams per cubic foot of catalyst. This is extremely active for the oxidation step and both NO and CO, where the NO remaining after the catalytic conversion on the order of 1 to 3 ppm in the exhaust and the carbon monoxide is substantially reduced to the range of zero to a few tenths of a part per million. This happens rapidly and happens at the conditions that exist in the stack from industrial turbines. Catalysts with palladium and with a combination of platinum and titanium may also be used.

The carbon monoxide is reacted extremely rapidly with the catalyst to carbon dioxide at temperatures anywhere above 200° to 1000° F. This presents the option of oxidizing the carbon monoxide as a separate step at a higher temperature and space velocity/flow velocity than the preferred range for converting the NO to $NO_2$. The oxidation of CO to $CO_2$ can occur at space velocities of up to 1,000,000 therefor $hr^{-1}$. Carbon monoxide oxidation can occur at the same time or prior to oxidation of the nitrogen oxides.

The second step in the process comprises the absorption of the nitrogen dioxide and a substantial part of the remaining nitrogen oxide in a catalyst bed (similar to the catalyst of the first step), in an activated carbon absorber bed, which will function at least at stack temperature conditions, in a bed of platinum coated alumina, or a combination of any of the above, and preferably the combination of catalyst bed and activated carbon bed. We have found that when most of the nitrogen oxides are present as nitrogen dioxides that the absorption reaction occurs to absorb some nitrogen oxide and essentially all nitrogen dioxide.

The catalyst bed may be a catalyst material, such as platinum, palladium, cobalt oxide and the like, coated onto the exterior of a support material, preferably a ceramic material such as alumina. A zirconia layer may be disposed over the ceramic and under the platinum coating. The catalyst may be in the form of a particulate or a coating on a ceramic or metal structure, such as a honeycomb structure.

The carbon bed may be any bed of an activated carbon material, and is preferably low ash content carbonized activated coconut shell.

The absorption step can occur at any temperature in the range of about 80° F. to 600° F. and the space velocity of the gas can be in the range of 1,000 to 50,000 therefor $hr^{-1}$. More preferably, the absorption conditions are a temperature of 280° F.±10° F. and a space velocity of 10,000 to 30,000 therefor $hr^{-1}$. Of course, it will be appreciated by a person of ordinary skill in the art that the conditions can vary substantially depending upon the desired result and the materials selected for the process. The selection of these materials and the optimization of the levels, temperatures and space velocities is well within the skill of persons of ordinary skill in the art.

The absorber, when it ceases to be effective, and specifically, when the level of pollutants increases beyond an acceptable level, can be replaced and the used absorber can be recharged to an effective status again.

BRIEF DESCRIPTION OF THE DRAWINGS

FIG. 7a is an enlarged drawing the NO and CO catalyst shown in FIG. 7.

DETAILED DESCRIPTION OF THE INVENTION

Examples of the performance of the present invention are set forth below. There are three main examples.

EXAMPLE NO. 1

Figure 1:
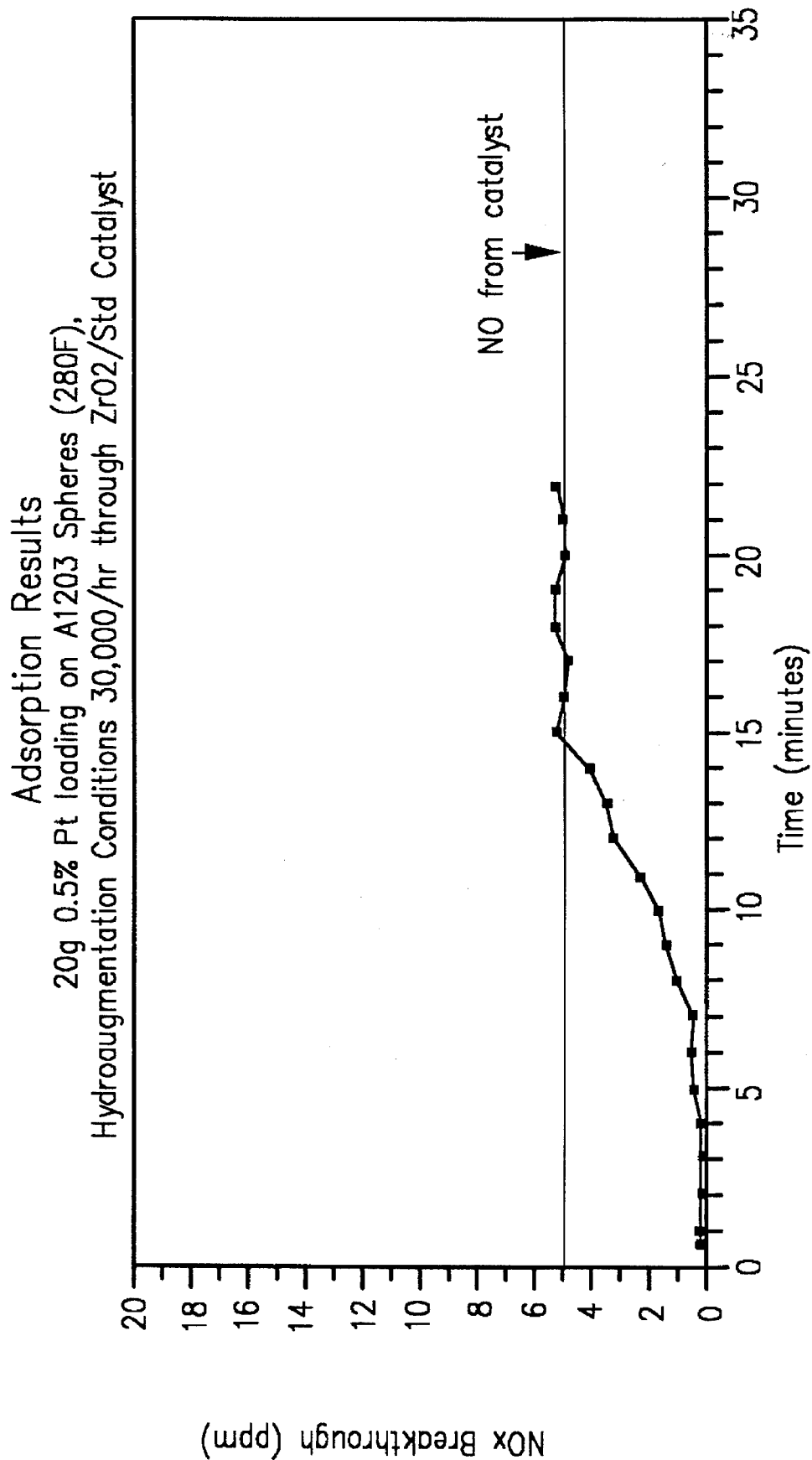
FIG. 1 is a graph of the results of Example 1 in which an exhaust gas sample is treated with an oxidizing catalyst, and then contacted with an absorbing bed comprising 20 grams of platinum loaded on a alumina ($Al_2O_3$) sphere at about 280° F. at a space velocity of 30,000 per hour. The graph shows the level of NOx over time.

The feed gas is a simulated turbine exhaust gas that was prepared with 40 ppm carbon monoxide and 20 ppm total nitrogen oxides. The oxidation catalyst is the platinum coated onto alumina coated with zirconia, which is the presently preferred embodiment of the invention. The oxidation reaction in the presence of the catalyst occurs at 545° F. with a space velocity of 30,000 therefor $hr^{-1}$. The carbon monoxide of the feed gas, after contact with the catalyst is zero to 0.1 ppm. The nitrogen dioxide is 17.5 ppm and the nitrogen oxide is 2.5 ppm. After the absorber, which is operated at 285° F. and 30,000 therefor $hr^{-1}$ space velocity per hour, the carbon monoxide is 0.1 ppm and the total of the nitrogen oxides is 0.35 ppm. The absorber used is designated as absorber A and is described below. The results over time of the NOx exhaust is depicted in FIG. 1.

EXAMPLE NO. 2

Figure 2:
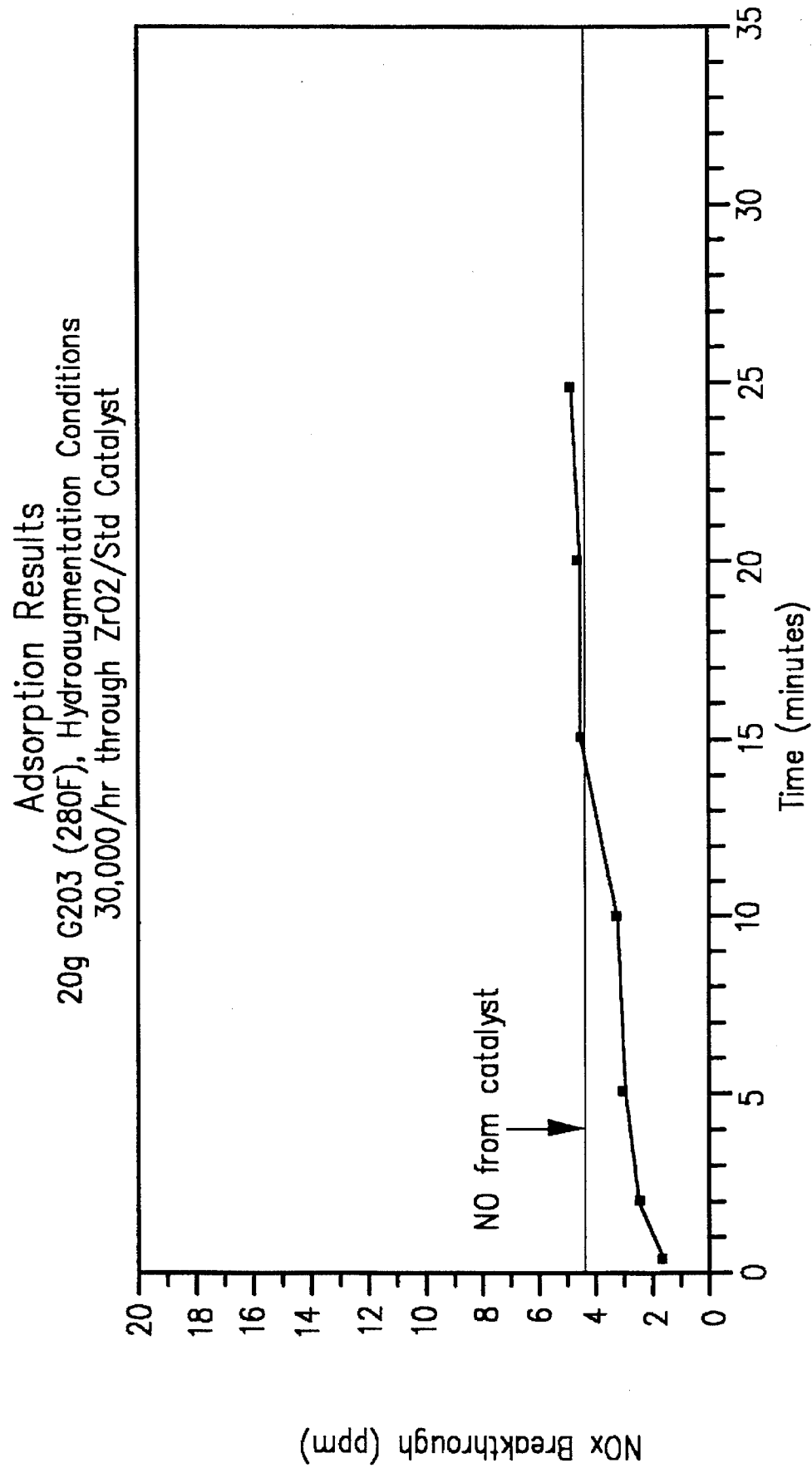
FIG. 2 is a graph of the results of Example 2 in which an exhaust gas sample is treated with an oxidizing catalyst, and then contacted with an absorbing bed comprising 20 grams of G203 carbon at about 280° F. at a space velocity of 30,000 therefor $hr^{-1}$. The graph shows the level of NOx over time.
Figure 3:
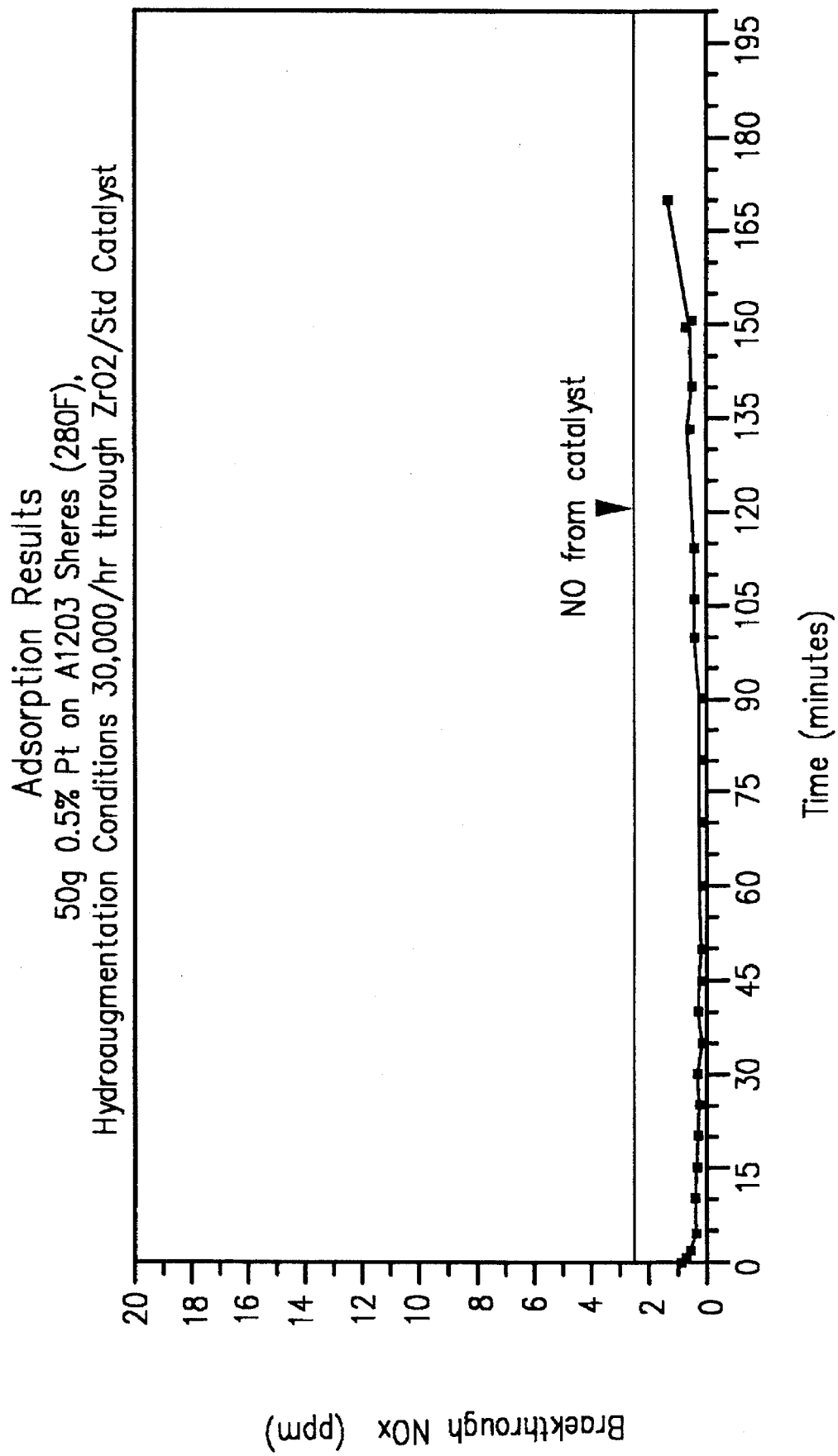
FIG. 3 is a graph of the results of Example 3 in which an exhaust gas sample is treated with an oxidizing catalyst, and then contacted with an absorbing bed comprising 50 grams of platinum loaded on a alumina ($Al_2O_3$) sphere at about 280° F. at a space velocity of 30,000 per hour. The graph shows the level of NOx over time.

In the second example the same feed gas is used with 40 ppm carbon monoxide and 20 ppm nitrogen oxides. The nitrogen oxides which are initially present prior to oxidation are at 20 ppm (total NOx) are 15.5 ppm of nitrogen dioxide ($NO_2$) and 4.5 ppm of nitrogen oxides (NO). The catalyst is the same catalyst as above in Example 1 and is operated at 575° F. After oxidation and then absorption using absorber B (described below) at 280° F., 30,000 space velocity, the carbon monoxide is 0 to 2 ppm. The total nitrogen oxide is 1.5 ppm. The results over time of this Example 2 are shown in FIG. 2.

EXAMPLE NO. 3

In this third example, the same composition of simulated stack gas and the same oxidation catalyst operating at 545° F. and 30,000 space velocity as in Example 1 is used. The nitrogen oxides of 20 ppm nitrogen oxides are 17.6 ppm nitrogen dioxide and 2.4 ppm nitrogen oxide. After oxidation and absorption using absorber C (described below) operated at 280° F., 30,000 space velocity, the carbon monoxide is in the range of 0 to 0.1 ppm and the total nitrogen oxides are 0.5 ppm.

The absorbers are as follows:

Example A: The absorber used is designated as Absorber A is platinum on alumina catalyst which is operated as an absorber at 280° F. because of the characteristics of this catalyst as a catalyst for nitrogen oxides. It is a very good absorber for the pollutants, as demonstrated by the example.

Example B: Absorber B comprises carbon, which is commercially designated as G203 from Westvaco originates from coconuts which are carbonized and activated.

Example C: Absorber C is a 50/50 mixture of the platinum on alumina catalyst and the carbon used in Example B.

The examples show how the nitrogen oxides are removed from the stack gas. Then, for a properly designed system for removal, two characteristics must be taken into account. One is that the pollutants tend to saturate the absorber and gradually the mount of nitrogen oxides that pass through the absorber will increase with time. The absorbers then should be removed from the stack gas periodically and the as the concentration of nitrogen oxides increases to some predetermined limit, for example, 0.5 to 2 ppm, the absorbers then are physically removed from the stack gas. This can be done by literally removing the absorbers and taking them to another reactor or by changing the flow of the stack gas through another absorber Also, by suitably sizing the absorbers can be operational for minutes or hours depending upon the nitrogen oxide concentration in the feed gas and the intended predetermined limit.

Regeneration of the absorbers can be accomplished by several different methods. If a small absorber unit is used, or the absorber is housed in a separate unit from the stack, the absorbers are heated with a slow flow of gas which will then displace the oxides of nitrogen as the absorbers are heated. The resultant concentration of nitrogen oxides in the product gas could be somewhere between 0.1 and 2%. These nitrogen oxides can then be separated economically for use commercially or the nitrogen oxides can be incinerated on site to produce a low NOx stream which is then re-fed to the turbine exhaust upstream of the catalyst. Another method of regeneration involves washing the NOx from the bed with water or other suitable solvent as is known in the art.

Preparation of Oxidizing Catalysts

EXAMPLE #4

One kilo of an alumina coating was prepared by first calcining a kilogram of alumina hydrate (Condea Disperal®) to 775° C. for 2 hours then mixing 500 grams of the calcined alumina with 500 grams of 7% acetic acid in distilled water. This mixture was ball milled in an alumina mill for 16 hours. The solids content was measured at 50% the density was 1.54 grams per cc the pH was measured at 3.8. This slurry was diluted with sufficient water to get 48% solids and had a viscosity of 38 centipoise.

EXAMPLE #5

Several 0.7 inch diameter samples of ceramic honeycomb structure with 200 square cells were core drilled from a 6 by 6 by 3 inch block. This sample was washed with distilled water and dried at 230° C. The samples were weighed and then dipped slowly into the alumina coating described in example #4. The excess slurry was blown off with an air nozzle and the samples were weighed wet and then dried in air and then at 230° C. for one hour.

EXAMPLE #6

A solution of zirconia was prepared by mixing equal weights of Tetrapropyl Zirconate (26.9% in n-Propanol) with ethanol. Several samples from example #5 were then immersed in the solution, the excess solution was shaken off. The samples were then allowed to hydrolyze in air for up to 8 hours and then dried at 250° F. for one hour.

EXAMPLE #7

A solution of Pt 2-ethylhexanoate which contained 25% Pt was added to Toluene to get a concentration of Pt such that the weight of solution equal to the Toluene uptake would contain sufficient Pt to give a loading of 1.62 milligrams of Pt per cc of catalyst sample. The dried monolith sample core was then immersed in the solution of Pt 2-ethylhexanoate, the excess solution was shaken off and recovered. The sample was then allowed to evaporate until the Toluene was gone. The sample was placed in an oven at 230° C. for one hour and calcined at 500° C. for one hour.

EXAMPLE #8

Samples of metal supports fabricated from stainless steel, into a honeycomb structure measuring 0.7 inches in diameter and having between 200 and 600 cells per square inch and having an oxide outer layer were coated and fired in a manner similar to examples #4 through #7. These catalysts were used as the oxidation catalysts for Examples 1 through 3.

The gases were measured as follows: CO was measured by a TECO model 48 infrared analyzer, $CO_2$ was measured by a Horiba $CO_2$ infrared meter and NO and $NO_2$ was measured using a TECO model #10R chemiluminescent detector with a stainless steel converter.

Structure of Process Apparatus

Figure 7:
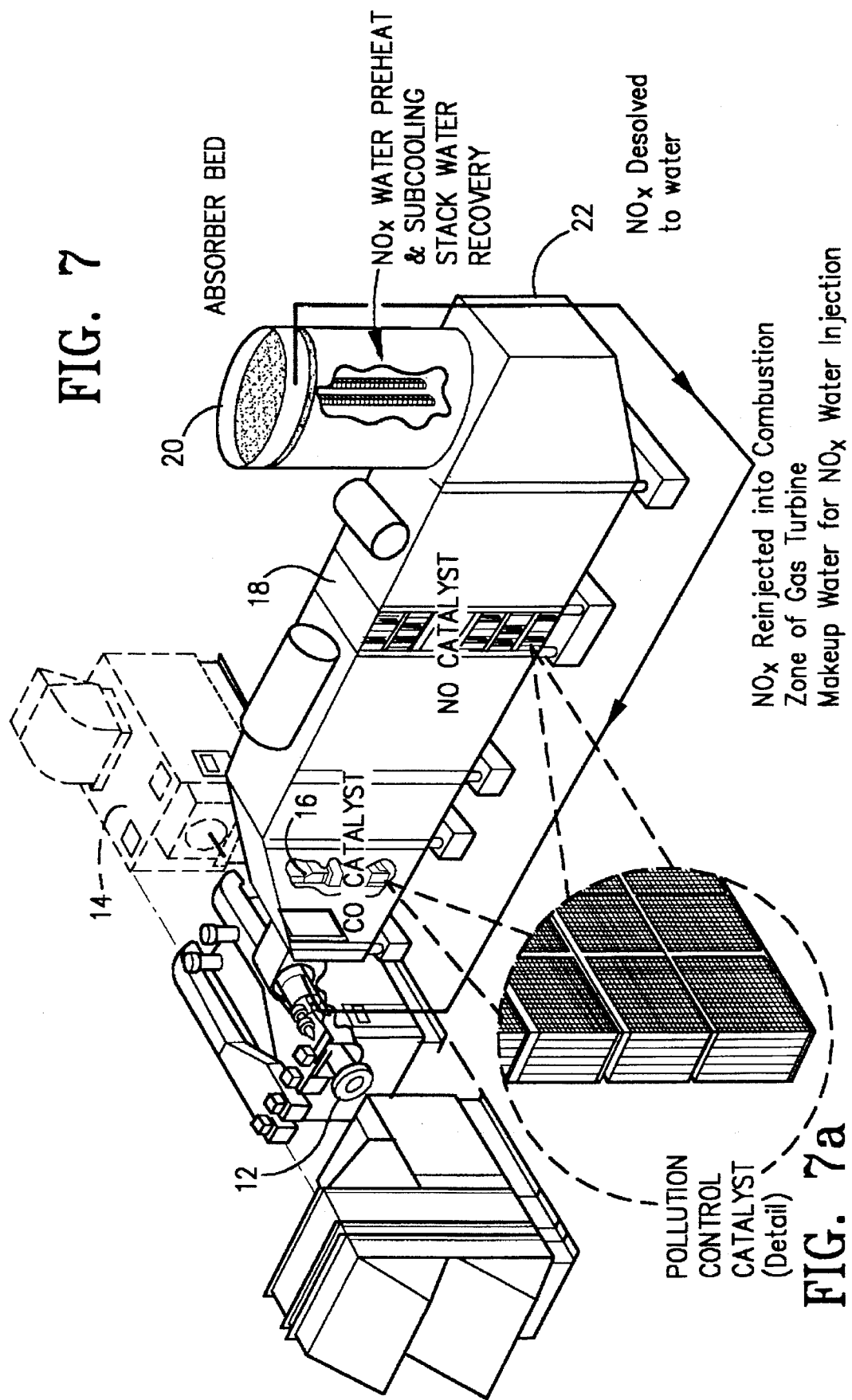
FIG. 7 is a schematic drawing of the apparatus used for the present invention as part of a gas turbine, energy generation system.

The apparatus of the present invention is shown in FIG. 7. The apparatus as shown in FIG. 7 is included with a gas turbine engine 12 and a generator 14, which are not intended to be a part of the scope of the present invention, but are adjunct to the apparatus and process of the NOx reduction system of the present invention.

The first element of the present invention is the CO catalyst 16 which comprises the catalyst described above. The CO catalyst is optional but is present in the preferred embodiment. A detailed drawing of the CO catalyst is set forth in FIG. 7a. As stated above, the CO catalyst can perform its necessary CO oxidation at temperatures up to 1000° F. and at space velocities up to 1,000,000 therefor $hr^{-1}$. The CO catalyst comprises a plurality of catalysts blocks made in accordance with the above described method.

The next element of the present invention is the NO catalyst 18 which may be the same as the CO catalyst. The space velocity and temperature are preferably lower for the NO catalyst as described above.

The next element of the present invention is the absorber bed 20 which may be activated carbon, catalyst material or a combination, or other materials as described above. The NOx absorbed by the absorber bed may be washed off with water or driven off with air or gas, or burned off as described herein, and it may be recycled back to the gas turbine 12 as shown through conduit 22.

Figure 4:
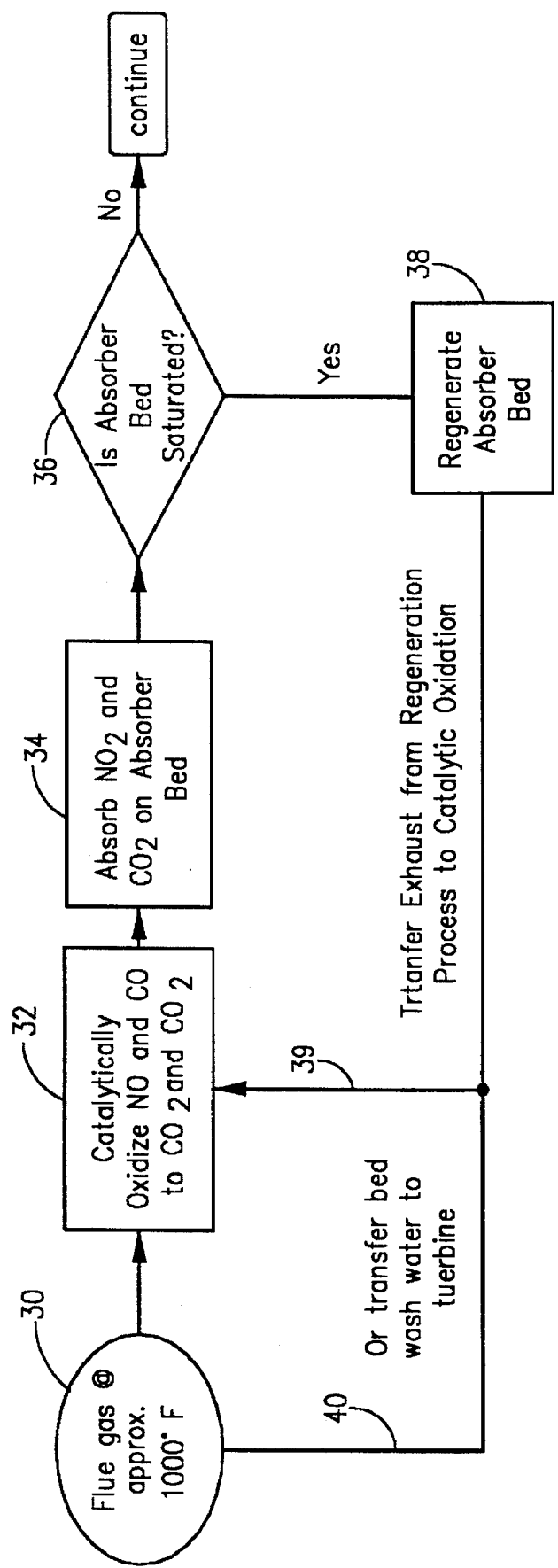
FIG. 4 is a flow chart illustrating the process of the present invention.
Figure 5:
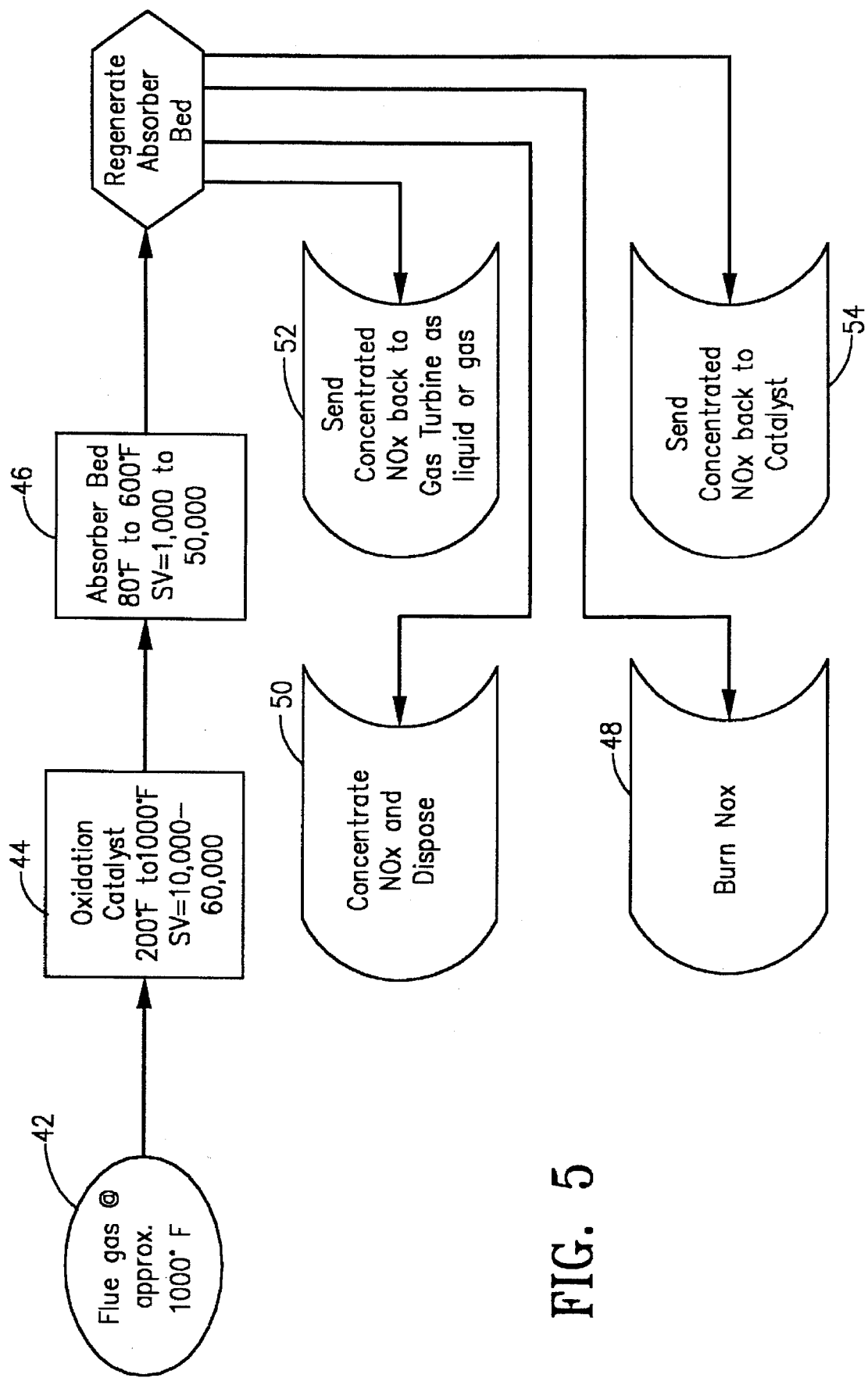
FIG. 5 is another flow chart of the present invention showing the range of process conditions.
Figure 6:
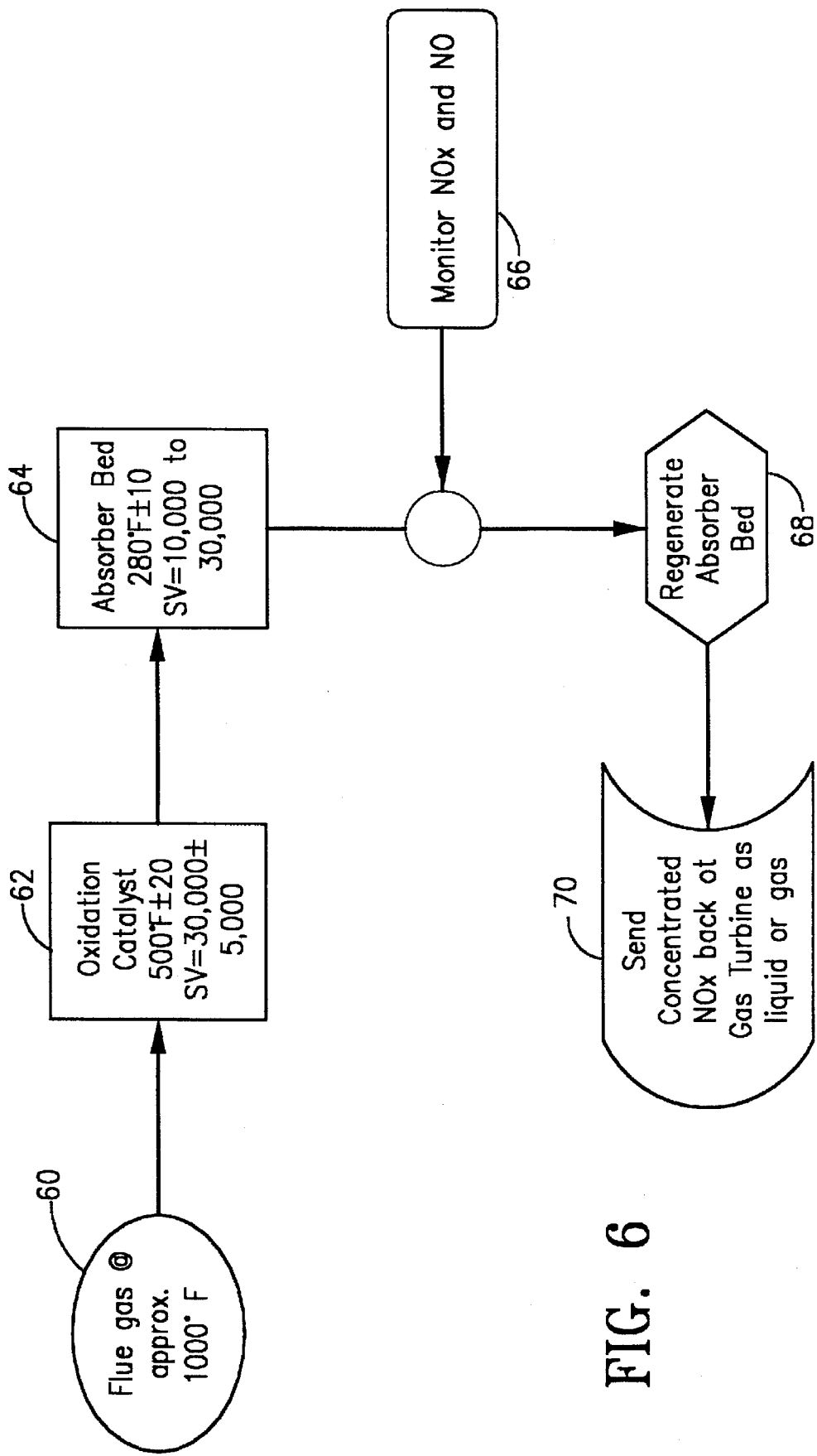
FIG. 6 is another flow chart of the present invention showing the preferred process conditions.

The process of the present invention is shown in FIG. 4–6. FIG. 4 shows the process generally. In the first step 30 the exhaust gas, which is a flue gas comes off the engine at a temperature of about 1000° F. after the energy for the generator is removed. The gas is contacted with an oxidation catalyst 32 which oxidizes the NO to $NO_2$ and the CO to $CO_2$. The oxidation product is then absorbed on the absorber bed 34. The absorber bed may be monitored 36, or more correctly, the gas stream may be monitored to determine the NOx level of the stream, which if it increases to an undesirable level, the absorber bed is regenerated 38. Alternatively, if the system is well-characterized, the absorber bed can be changed or regenerated at defined time intervals. The product from the absorber bed, which contains concentrated NOx in gas is transferred back to the catalyst 39, or if washed off, is in the form $HNO_3$ and is transferred to the turbine in liquid form 40 and reused.

FIG. 5 shows the process of the present invention in more detail with the process ranges. The flue gas enters the system at about 1,000° F. 42. It contacts the oxidation catalyst at 200° F. to 1000° F. and a space velocity of 10,000 to 60,000 therefor $hr^{-1}$ 44. The NOx is then absorbed on the absorber bed at a temperature of 80° F. to 600° F. and a space velocity of 1,000 to 50,000 therefor $hr^{-1}$ 46. The absorber bed can then be regenerated any of a number of ways including driving off the NOx and burning it 48, concentrating the NOx and disposing it 50 (it can be concentrated in a pure form and sold as nitric acid or some other commercially desirable form), recirculating the NOx back to the gas turbine engine in liquid or gas form 52 or recirculating the NOx in gas form back to the catalyst 54.

FIG. 6 shows the presently preferred embodiment. The flue gas 60 is contacted with the oxidation catalyst at 550° F.±20 and a space velocity of 30,000±5,000 therefor $hr^{-1}$ 62. The oxidized exhaust is then absorbed at 280° F.±10 and a space velocity of 10,000 to 30,000 therefor $hr^{-1}$ 64. The NOx and NO, and possibly the CO is monitored 66, although this is not necessary if the system is well-characterized. When necessary, the absorber is regenerated 68 and concentrated NOx is sent back to the gas turbine for rerunning 70.

FIGS. 8–14 illustrate the results of various experiments which demonstrate the effectiveness of the present conditions with the alteration of various process parameters.

Figure 8:
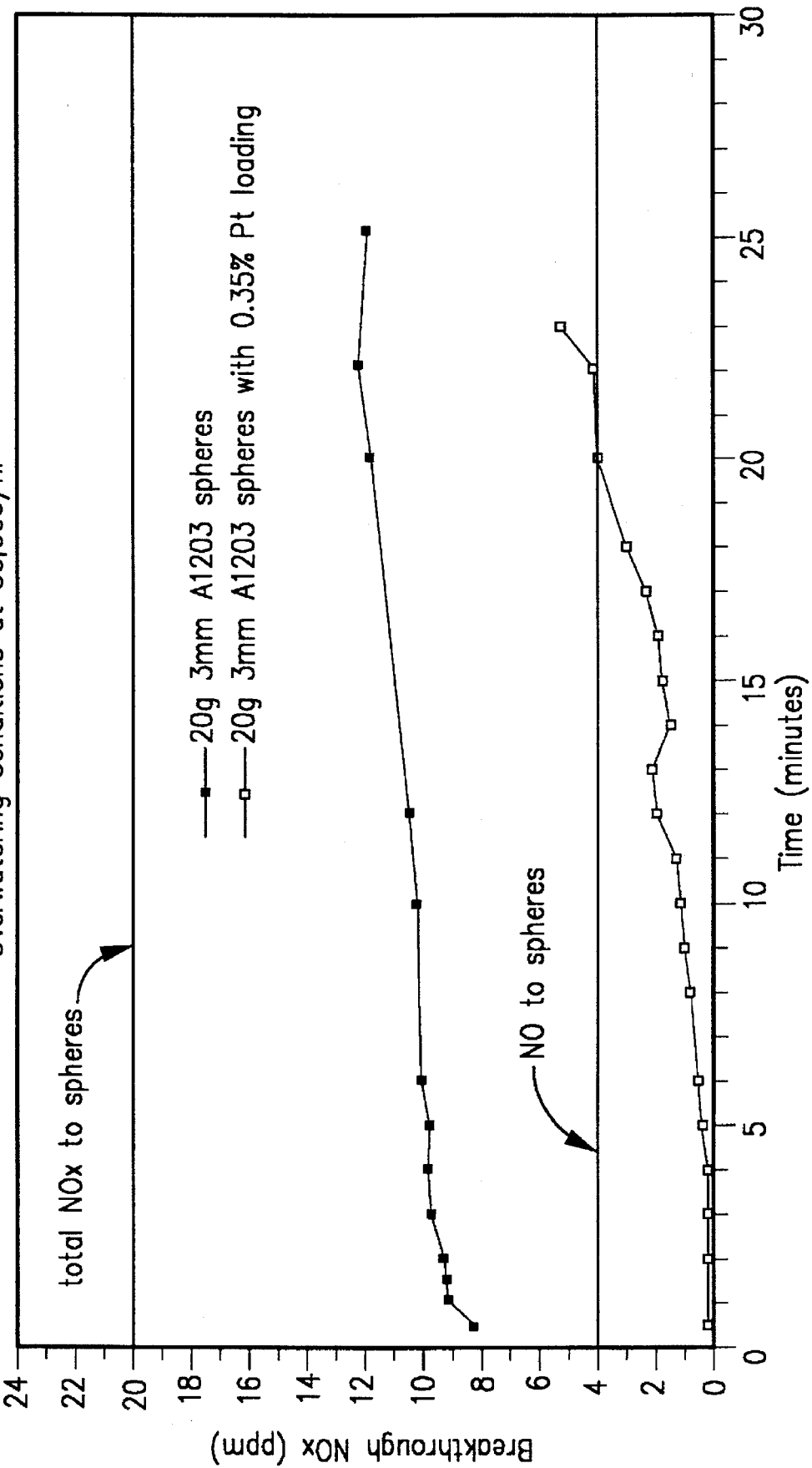
FIG. 8 is a graph of showing a comparison of the effectiveness of alumina spheres in the absorber bed to spheres of alumina coated with platinum. The graph shows the level of NOx over time for each type of absorber bed.

FIG. 8 is a graph of showing a comparison of the effectiveness of alumina spheres in the absorber bed to spheres of alumina coated with platinum. The graph shows the level of NOx over time for each type of absorber bed. The platinum loaded spheres are preferred although the alumina spheres are also effective in absorbing about one half of the NOx.

Figure 9:
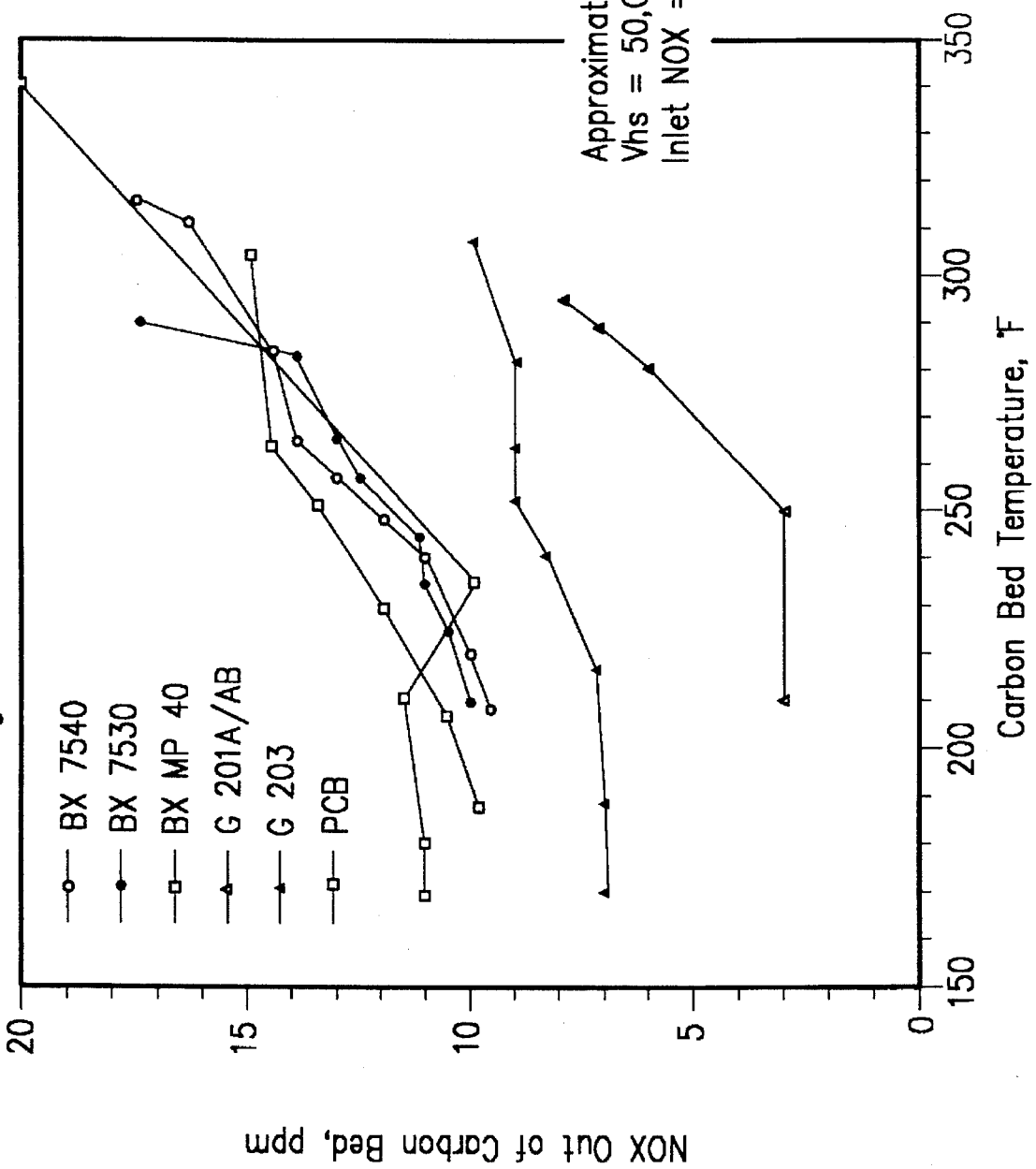
FIG. 9 is a graph of the results of an experiment showing the effectiveness of various commercially available activated carbons as absorbers. The graph shows the level of NOx over a temperature range of 150° F. to about 325° F.

FIG. 9 is a graph of the results of an experiment showing the effectiveness of various commercially available activated carbons as absorbers. The graph shows the level of NOx over a temperature range of 150° F. to about 325° F. G201 and G203A/AB from Westvaco performed the best.

Figure 10:
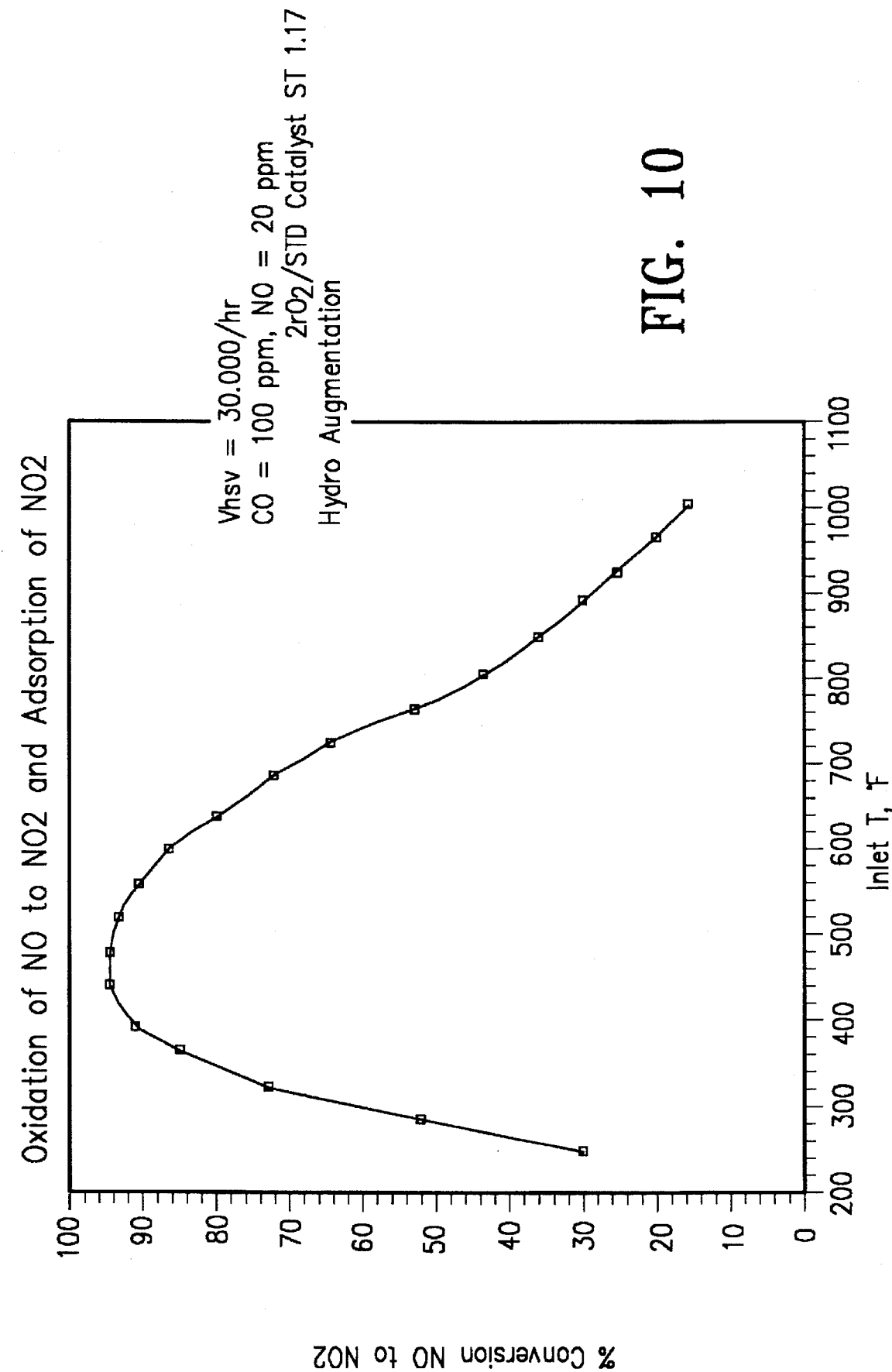
FIG. 10 is a graph showing the oxidation of NO to $NO_2$ and Adsorption of $NO_2$ through a temperature range of about 250° to 1000° F. The space velocity was 30,000 therefor $hr^{-1}$ and the input CO=100 ppm and the input NO=20 ppm. The catalyst was the alumina zirconia catalyst. Oxidation was most effective in the range of about 350° F. to 650° F.

FIG. 10 is a graph showing the oxidation of NO to NO2 and Adsorption of NO2 through a temperature range of about 250° to 1000° F. The space velocity was 30,000 therefor $hr^{-1}$ and the input CO=100 ppm and the input NO=20 ppm. The catalyst was the alumina zirconia catalyst described in Example 7. Oxidation was most effective in the range of about 350° F. to 650° F.

As used throughout the specification, the term absorption and adsorption are used interchangeably with respect to the action of the absorber bed since we have determined that both absorption and adsorption appear to occur.

Figure 11:
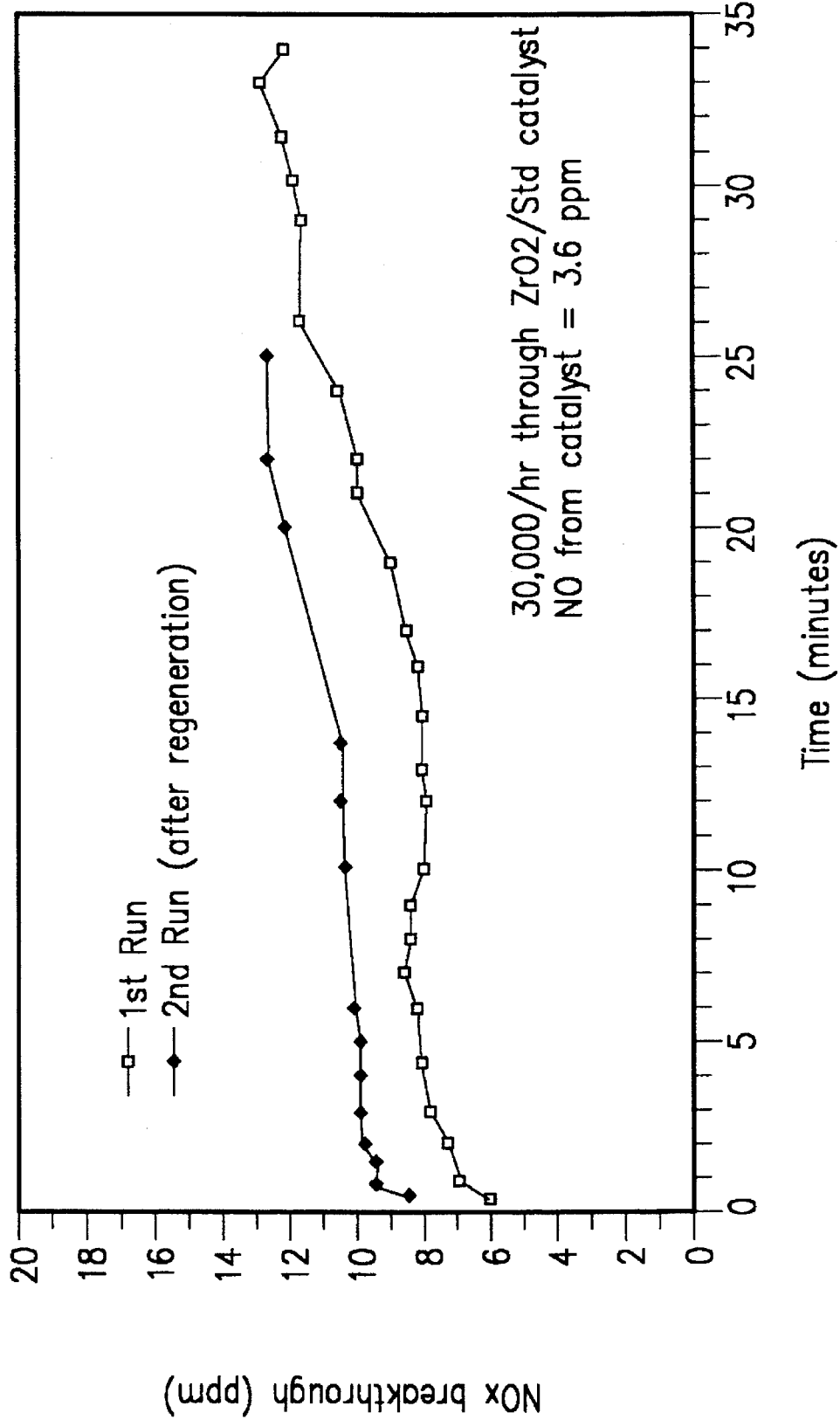
FIG. 11 is a graph showing the absorption of NOx on a bed comprising 20 g of alumina spheres and a comparison of regenerated and fresh absorbent over time.

FIG. 11 is a graph showing the absorption of NOx on a bed comprising 20 g of alumina spheres and a comparison of regenerated and fresh absorbent over time. By comparing FIGS. 1 and 11, it can be determined that alumina spheres with a platinum coating are a superior absorber relative to alumina spheres without the platinum coating.

Figure 12:
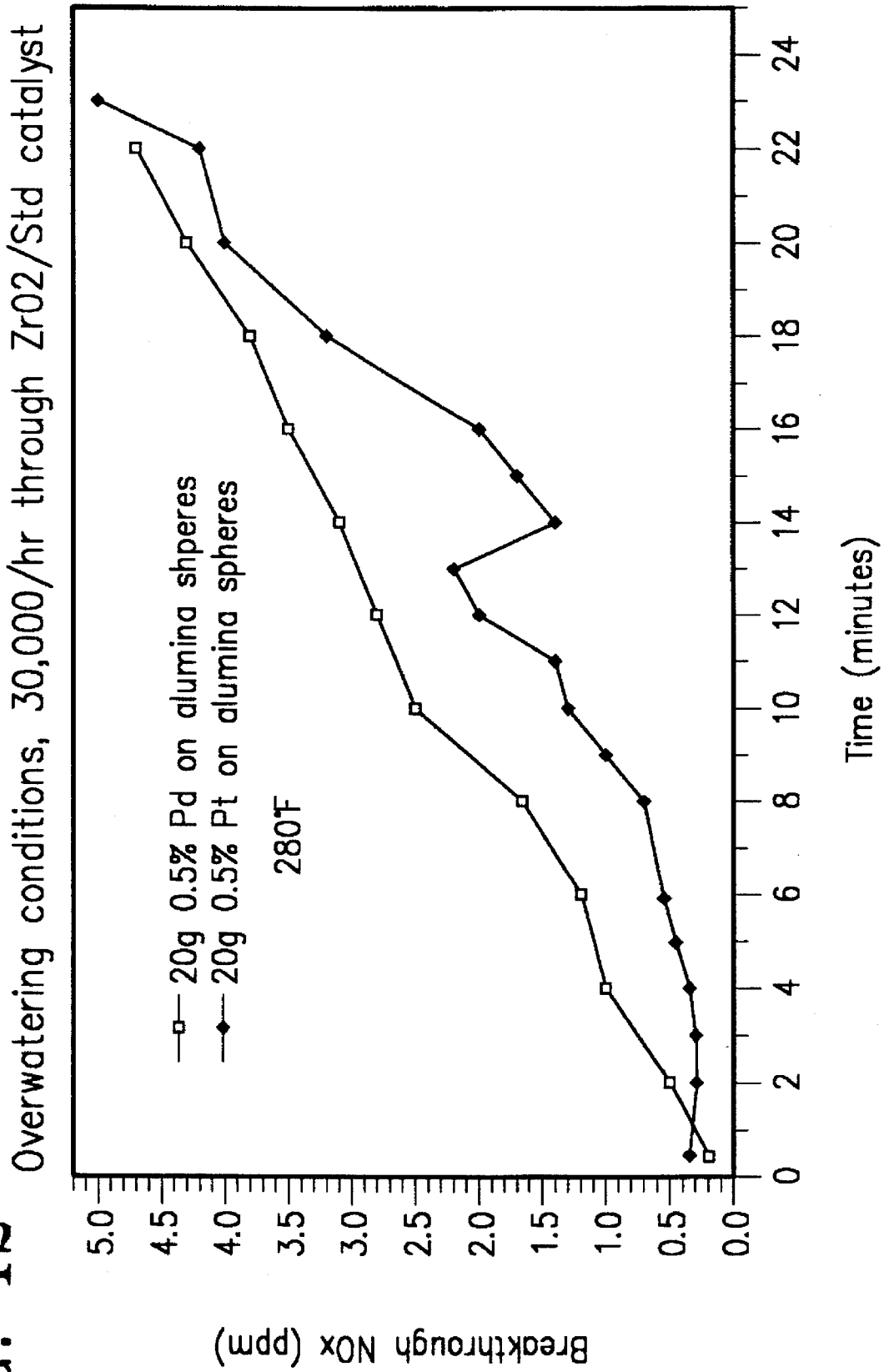
FIG. 12 is a graph which compares the effectiveness of oxidation of 0.5% palladium-loaded alumina spheres to 0.5% platinum loaded spheres as an absorbent.

FIG. 12 is a graph which compares the effectiveness of oxidation of 0.5% palladium-loaded alumina spheres to 0.5% platinum loaded spheres as an absorbent at 280° F. Both are effective, and the platinum is preferred.

Figure 13:
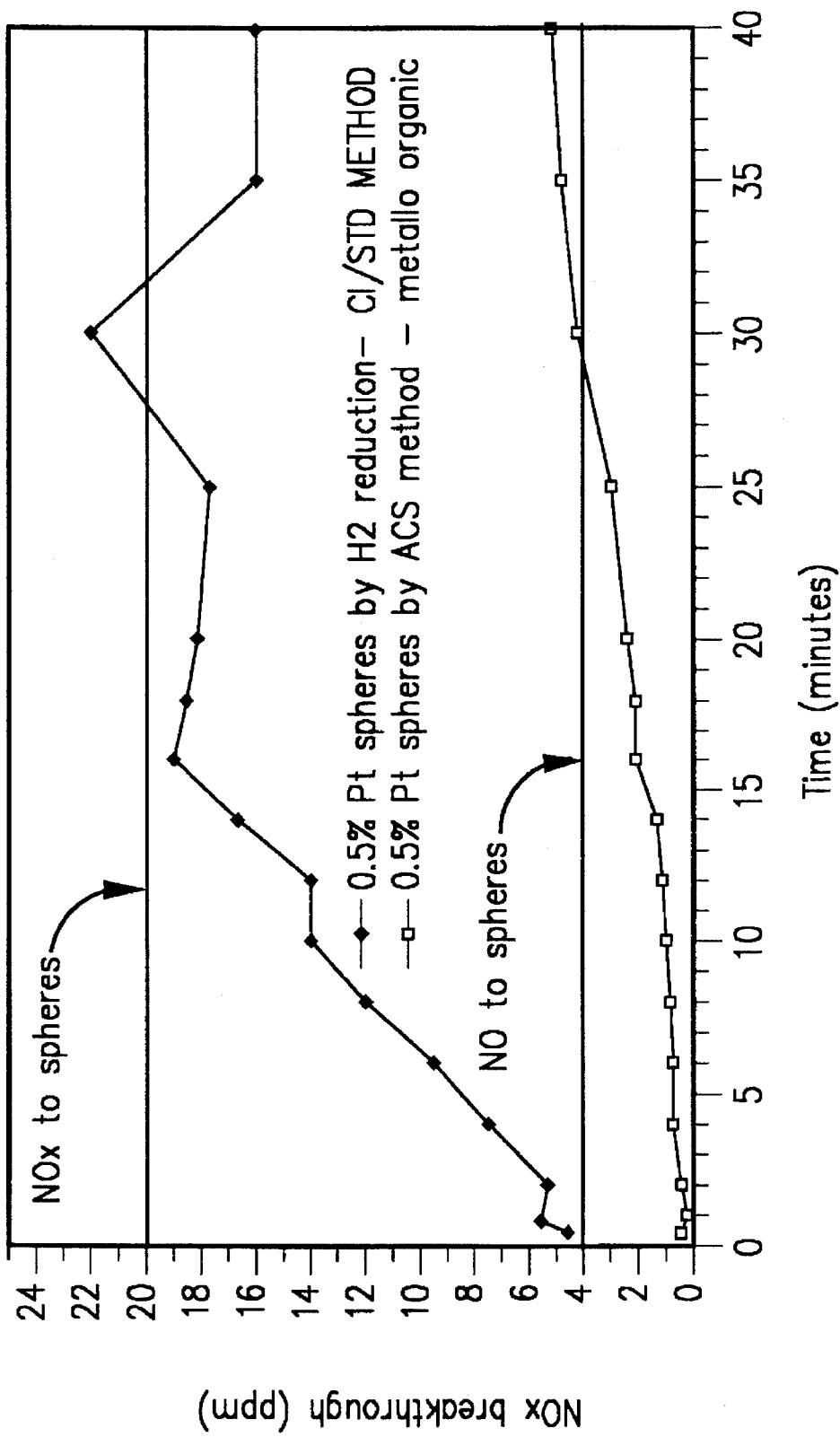
FIG. 13 is a graph showing the Adsorption of $NO_2$ over time for absorbing materials made two different ways. The solid circle was mad by a prior art method using chlorine deposition of platinum. The open circle shows the NOx breakthrough using the preferred catalyst material of the present invention.

FIG. 13 is a graph showing the Adsorption of $NO_2$ over time for absorbing materials made two different ways. The solid circle was made by a prior art method using chlorine deposition of platinum. The open circle shows the NOx breakthrough using the preferred catalyst material of the present invention. The preferred embodiment is obviously better.

Figure 14:
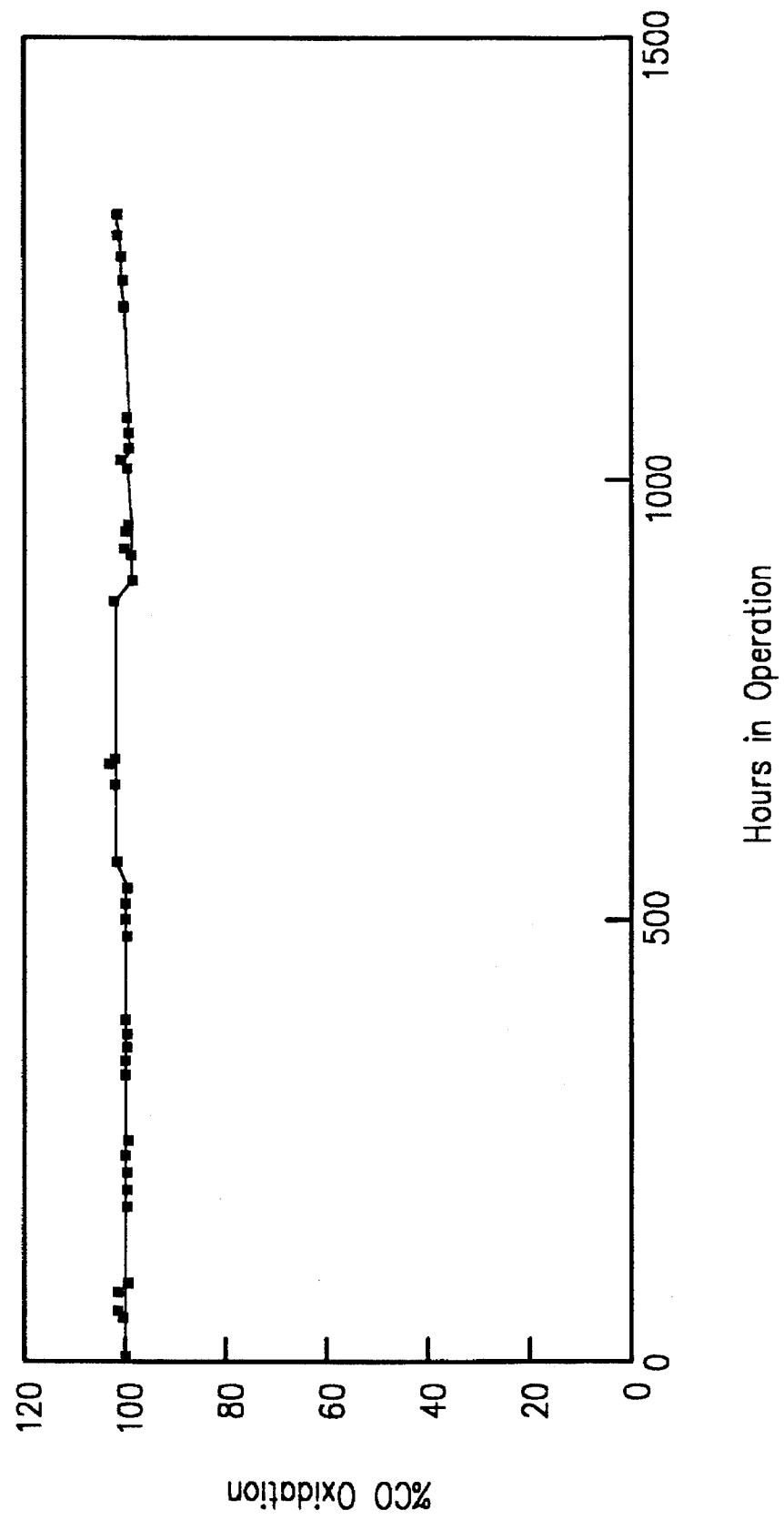
FIG. 14 shows the percentage of CO oxidation over time using the catalyst of the present invention at a temperature of about 1000° F. and a space velocity in the range of 650,000 to 1,000,000 therefor $hr^{-1}$.

FIG. 14 shows results of an experiment using the slip stream from a power plant with a gas turbine engine. This graph shows the percentage of CO oxidation over time using the catalyst of the present invention at a temperature of about 1000° F. and a space velocity in the range of 650,000 to 1,000,000 therefor $hr^{-1}$ for a period of about 1300 hours of operation. CO oxidation was essentially complete throughout the entire experiment.

What is claimed is:

1. A process to remove nitrogen oxides from turbine exhaust comprising the steps of:

contacting a feed stream consisting essentially of nitrogen oxides including nitrogen dioxide and nitrogen oxide with an oxidation catalyst of platinum on an alumina support coated with zirconia at a space velocity in the range of 10,000 to 60,000 $hr^{-1}$ at a temperature in the range of 200° to 1000° F., whereby substantially all of the nitrogen oxide is oxidized to nitrogen dioxide to produce an oxidized stream having reduced nitrogen oxide content from said feed stream and contacting said oxidized stream with an absorber selected from platinum or palladium coated over alumina, activated carbon or mixtures thereof at a space velocity in the range of 1000 to 50,000 $hr^{-1}$ and temperatures in the range of 80° to 600° F. whereby an exhaust stream having a substantially reduced amount of nitrogen dioxide from said oxidized stream is produced.

2. The process of claim 1 wherein said process also oxidizes CO to $CO_2$, whereby the exhaust streams are substantially free of carbon monoxide.

3. The process of claim 1 wherein said catalytic oxidation step occurs at a temperature of 550° F.±20° F. and a space velocity of 30,000±5,000 $hr^{-1}$.

4. The process of claim 1 wherein said absorption step occurs at a temperature in the range of 280° F.±10° F. and a space velocity of 10,000 to 30,000 $hr^{-1}$.

5. The process of claim 1 wherein said process further comprises the step of monitoring the exhaust gas after the absorption step to determine the level of nitrogen oxides therein.

6. The process of claim 5 comprising the steps of removing the absorber from the gas stream and providing a new absorber after absorption of nitrogen oxides therein.

7. The process of claim 6 further comprising the step of regenerating the removed absorber.

8. The process of claim 2 wherein the support comprises particulate alumina or an alumina coated ceramic or metal structure.

9. The process of claim 8 wherein the ceramic or metal structure is a honeycomb structure.

10. The process of claim 1 comprising regenerating the absorber.

11. The process of claim 1 wherein the absorber comprises an alumina coated with platinum or palladium.

12. The process of claim 1 wherein the absorber comprises an activated carbon.

13. The process of claim 1 wherein the absorber comprises a mixture of alumina coated with platinum and activated carbon.

14. The process of claim 1 wherein the absorber comprises a composite of alumina and activated carbon in substantially homogenous layers.

15. The process of claim 1 wherein said catalyst comprises a support selected from ceramic and stainless steel, and an alumina coating over said support.

16. The process of claim 1 wherein said absorber comprises layered platinum coated alumina and activated carbon.

* * * * *